US012568260B2

(12) United States Patent
Shin

(10) Patent No.: US 12,568,260 B2
(45) Date of Patent: Mar. 3, 2026

(54) SYSTEMS AND METHODS FOR GENERATING TRANSITIONS BETWEEN VIDEOS

(71) Applicant: Google LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 113 days.

(21) Appl. No.: 18/236,244

(22) Filed: Aug. 21, 2023

(65) Prior Publication Data

US 2025/0071354 A1 Feb. 27, 2025

(51) Int. Cl.
| | |
|---|---|
| *H04N 7/16* | (2011.01) |
| *H04N 21/2343* | (2011.01) |
| *H04N 21/25* | (2011.01) |

(52) U.S. Cl.
CPC ....... *H04N 21/2343* (2013.01); *H04N 21/251* (2013.01)

(58) Field of Classification Search
CPC .......................... H04N 21/2343; H04N 21/251
USPC ........................................................ 725/146
See application file for complete search history.

(56) References Cited

U.S. PATENT DOCUMENTS

| | | | | |
|---|---|---|---|---|
| 9,235,878 | B1 * | 1/2016 | Hirsh ......................... | G06T 5/73 |
| 10,818,043 | B1 * | 10/2020 | Barnes ....................... | G06T 7/40 |

| | | | | |
|---|---|---|---|---|
| 11,849,173 | B1 * | 12/2023 | Wu ...................... | H04N 21/2187 |
| 2014/0208379 | A1 * | 7/2014 | Sinha ...................... | H04N 7/025 |
| | | | | 725/116 |
| 2020/0059691 | A1 * | 2/2020 | Seo ...................... | H04N 21/8352 |
| 2020/0137384 | A1 * | 4/2020 | Kwong ................. | H04N 19/11 |
| 2021/0064925 | A1 * | 3/2021 | Shih ........................ | G06N 3/084 |
| 2021/0182540 | A1 * | 6/2021 | Cower ................... | H04N 19/21 |
| 2022/0210213 | A1 * | 6/2022 | Petrovic ............. | H04N 21/2402 |
| 2022/0253136 | A1 * | 8/2022 | Holder ................... | G06F 3/017 |
| 2022/0329847 | A1 * | 10/2022 | Parashar .................. | G06T 7/11 |
| 2024/0114180 | A1 * | 4/2024 | Maharana ............ | H04N 19/172 |
| 2024/0169479 | A1 * | 5/2024 | Wang ................... | G06T 3/4053 |
| 2024/0282094 | A1 * | 8/2024 | Tsimpoukelli ......... | G06V 10/80 |
| 2024/0346774 | A1 * | 10/2024 | Kwak ...................... | G06T 11/00 |
| 2024/0354553 | A1 * | 10/2024 | Finlay ................. | G06N 3/0495 |
| 2024/0371048 | A1 * | 11/2024 | Ravi ...................... | G06N 3/045 |
| 2024/0428491 | A1 * | 12/2024 | Yoon ...................... | G06T 13/40 |
| 2025/0142145 | A1 * | 5/2025 | Kreis ..................... | G06V 10/24 |

* cited by examiner

*Primary Examiner* — Sahar Aqil Riaz
(74) *Attorney, Agent, or Firm* — Lowenstein Sandler LLP

(57) ABSTRACT

A method for generating a video transition sequence between a first and a second video is provided. The method first identifies and embeds starting and ending images for the video transition sequence into a latent vector space. The method then interpolates to generate an interpolation trajectory between the starting and ending image embeddings within the latent vector space. The method then reconstructs the interpolation trajectory from the latent vector space to a final video transition sequence in the original image vector space. This video transition sequence is then displayed so as to smoothly transition between two videos.

20 Claims, 8 Drawing Sheets

600

Identifying a starting image for the video transition sequence 602 identifying an ending image for the video transition sequence 604

Generating a starting embedding 606

Generating an ending embedding 608

Interpolating to generate an embedded transition sequence 610

Obtaining the video transition sequence 612

Displaying the video transition sequence 614

SYSTEMS AND METHODS FOR GENERATING TRANSITIONS BETWEEN VIDEOS

TECHNICAL FIELD

The instant specification generally relates to systems and methods for generating transitions between two videos.

BACKGROUND

Today, a user can access an unprecedented amount of video data online. Many of these videos are much shorter than a full-length movie and associated with dedicated video-streaming platforms (e.g., YouTube, Twitch, Instagram, etc.). As such, a user may enter such a video-streaming platforms and proceed to self-select a sequence of several videos to watch in series (i.e., back-to-back), with few or limited breaks in between consecutive videos. A user can select a video, watch the video, and (usually at, or near, the end of the video) select the next video to play in the sequence of videos. The selected video can immediately begin to play once the previous video has ended. In such a way, a user can watch a sequence of videos, of any length, or time.

Although a video-streaming platform may recommend the next video for a user to watch, that does not necessarily mean a viewer will choose that video, or that consecutive videos will be related. As an example of a watched sequence of videos, a viewer can navigate from an educational lecture to a music video, to a cooking tutorial, in a short amount of time and using only several clicks. The ability to traverse a wide variety and type of videos, combined with a user's ability to control the sequence of that traversal, can provides a unique and diverse viewing experience.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

According to one aspect of the present disclosure, a method for generating a video transition sequence between a first video and a second video is provided. The method includes, identifying, for the video transition sequence, a starting image and an ending image, wherein the starting image is associated with the first video and the ending image is associated with the second video. The method further includes, generating, using a one or more neural networks, a starting embedding of the starting image in a latent vector space. The method further includes, generating, using the one or more neural networks, an ending embedding of the ending image in the latent vector space. The method further includes, interpolating between the starting embedding and the ending embedding to generate an embedded transition sequence in the latent vector space. The method further includes, obtaining, using the one or more neural networks, the video transition sequence between the first video and the second video using the embedded transition sequence in the latent vector space. The method further includes, displaying, on a graphical user interface, the obtained video transition sequence between the first video and the second video.

In some aspects, identifying the starting image and the ending image is based on at least one of: a similarity between the starting image and the ending image, a proximity of the ending image to a first image of the second video, or a proximity of the starting image to a last image of the first video.

In some aspects, the one or more neural networks comprises a generative network of a generative adversarial network (GAN) that comprises a discriminator network and the generator network.

In some aspects, the starting embedding and the ending embedding are generated using the generator network of the GAN.

In some aspects, the video transition sequence between the first video and the second video is obtained using the generator network of the GAN.

In some aspects, the generator network and the discriminator network of the GAN are pre-trained using videos associated with a video-streaming platform, and wherein the generator network is pre-trained using labels generated by the discriminator network of the GAN, a loss function applied to the labels, and an optimization algorithm.

In some aspects, interpolating between the starting image embedding and the ending image embedding comprises using at least one of a linear interpolation, a spherical linear interpolation, or a polynomial interpolation.

In some aspects, interpolating between the starting image embedding and the ending image embedding comprises use of an interpolation polynomial, wherein one or more coefficients of the interpolation polynomial are randomly generated.

In some aspects, the embedded transition sequence in the latent vector space comprises a plurality of embedded transition vectors in the latent vector space, wherein the video transition sequence comprises a plurality of transition sequence frames, and wherein obtaining the video transition sequence comprises reconstructing each vector of the plurality of embedded transition vectors in the latent vector space into a frame of the plurality of transition sequence frames.

In some aspects, the video transition sequence between the first video and the second video has a frame rate of 30 frames per second or more.

In some aspects, the video transition sequence between the first video and the second video has a duration that is determined by a loading time of the second video, wherein the second video begins to load once the first video has ended.

In some aspects, the second video comprises at least one of a video suggested to a user or a video on a playlist for the user, wherein the video transition sequence between the first video and the second video is obtained while the first video is being displayed to the user and prior to receiving a user request for the second video, and wherein displaying the obtained video transition sequence is responsive to receiving the user request for the second video.

In some aspects, the method further includes, obtaining, prior to receiving the user request for the second video, an additional video transition sequence between the first video and a third video.

According to one aspect of the present disclosure, a system for generating a video transition sequence is provided. The system includes a memory device, and a processing device communicatively coupled to the memory device. In some aspects, the processing device is to identify, for the video transition sequence, a starting image and an ending image. In some aspects, the starting image is associated with a first video and the ending image is associated with a second video. The processing device is to further generate, using a one or more neural networks, a starting embedding of the starting image in a latent vector space. The processing device is to further, generate, using the one or more neural networks, an ending embedding of the ending image in the latent vector space. The processing device is to further, interpolate between the starting embedding and the ending embedding to generate an embedded transition sequence in the latent vector space. The processing device is to further, obtain, using the one or more neural networks, the video transition sequence between the first video and the second video using the embedded transition sequence in the latent vector space. The processing device is to further, display, on a graphical user interface, the obtained video transition sequence between the first video and the second video.

In some aspects, identifying the starting image and the ending image is based on at least one of a similarity between the starting image and the ending image, a proximity of the ending image to a first image of the second video, or a proximity of the starting image to a last image of the first video.

In some aspects, the one or more neural networks comprises a generative network of a generative adversarial network (GAN) that comprises a discriminator network and the generator network.

In some aspects, the starting embedding and the ending embedding are generated using the generator network of the GAN.

In some aspects, the video transition sequence between the first video and the second video is obtained using the generator network of the GAN.

In some aspects, the generator network and the discriminator network of the GAN are pre-trained using videos associated with a video-streaming platform, and wherein the generator network is pre-trained using labels generated by the discriminator network of the GAN, a loss function applied to the labels, and an optimization algorithm.

According to one aspect of the present disclosure, a non-transitory computer readable storage medium is provided. In some aspects, the computer readable storage medium includes instructions that, when executed by a processing device, causes the processing device to perform operations including, identifying, for the video transition sequence, a starting image and an ending image. In some aspects, the starting image is associated with a first video and the ending image is associated with a second video. The operations further include, generating, using a one or more neural networks, a starting embedding of the starting image in a latent vector space. The operations further include, generating, using the one or more neural networks, an ending embedding of the ending image in the latent vector space. The operations further include, interpolating between the starting embedding and the ending embedding to generate an embedded transition sequence in the latent vector space. The operations further include, obtaining, using the one or more neural networks, the video transition sequence between the first video and the second video using the embedded transition sequence in the latent vector space. The operations further include, displaying, on a graphical user interface, the obtained video transition sequence between the first video and the second video.

BRIEF DESCRIPTION OF THE DRAWINGS

Aspects and embodiments of the present disclosure will be understood more fully from the detailed description given below and from the accompanying drawings of various aspects and embodiments of the disclosure, which, however, should not be taken to limit the disclosure to the specific aspects or embodiments, but are for explanation and understanding only.

DETAILED DESCRIPTION

Figure 1A:
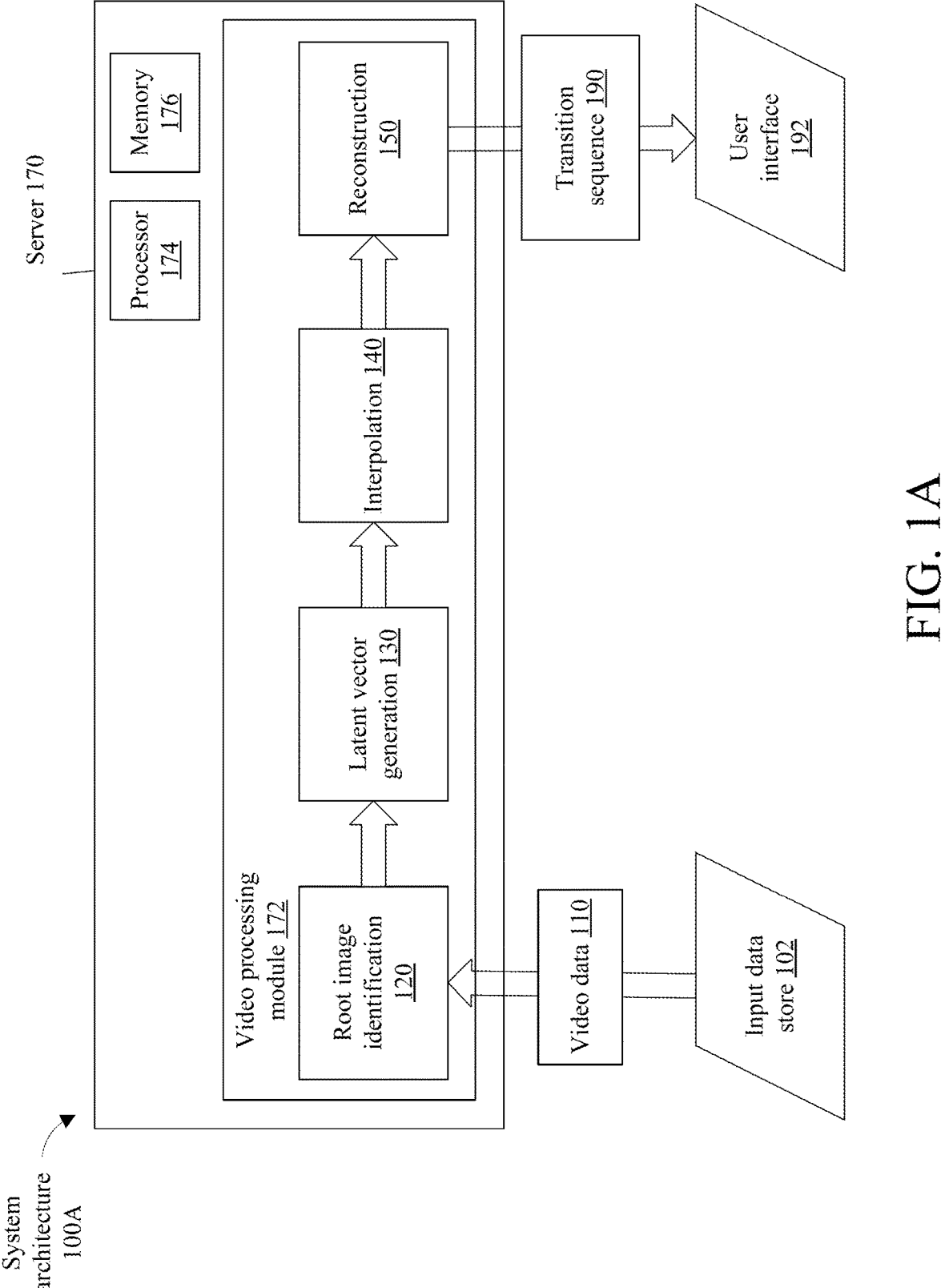
FIG. 1A illustrates an example system architecture capable of supporting a video processing module that generates a video transition sequence, in accordance with one embodiment of the present disclosure.

Existing video-streaming platforms share some challenges when delivering video content to a viewer. One such challenge is that flexibility in video selection, along with the wide range of accessible videos, can lead to a visual discontinuity in the sequence of videos. Such discontinuity may be in the video content, a video's sentiment, tone, color, language, or some other characteristics. For example, the video sequence selected by a viewer might transition from a video with dark, suspenseful, and thrilling qualities to one that is bright, light-hearted, and humorous, whether or not such a video has been recommended by the platform. Subsequently, a user may select a next video that is sharp, fast-paced, and action-packed, and so on. In such an example and in such a way, video content, and transitions between such video content, may be abrupt. In some cases, such abruptness can reach the point of jarring and can negatively affect the user experience. Accordingly, it is advantageous to improve continuity and coherency in this type of online video user experience.

In some cases, such a goal may be accomplished with smoother transitions between videos. Gradually introducing elements of the next video, while gradually exiting elements of the current video can provide a gentler and more natural experience for the user. Smoother transitions between consecutive and diverse video content could provide a more seamless and intuitive viewing experience, aiding in a user's cognitive and emotional adjustment between two videos.

Aspects and implementations of the present disclosure address these and other challenges of the modern video-streaming platforms by providing systems and techniques for autonomous generation of seamless transitions in this type of online video consumption experience. According to embodiments of the present disclosure, a computer program can identify a starting point for a video transition within a first video, identify an ending point for a video transition in an upcoming, second video, and generate a smooth video transition sequence between the starting and ending points, based on the combined elements of the first and second video content.

In some embodiments, both the first video and the second video can first be analyzed to identify root still images for starting and ending points of the video transition sequence to be generated, e.g., a still image near the end of the first video may be identified as a starting point and a still image near the first image in the second, upcoming video may be identified as an ending point.

Next, to generate the video transition sequence between the starting and ending still images, a pre-trained generator of a generative adversarial networks (GAN) (including a generator (G) network and a discriminator (D) network) can be used to generate latent vectors (e.g. image embeddings) representing both still images in a latent vector space. More specifically, the generator may be applied in a GAN inversion subprocess to the starting and ending still images to generate latent vector representations and embed the image data of both images into starting and ending latent space vector representations.

In some embodiments, after generating starting and ending latent space vector representations, an interpolation trajectory between the two latent vector representations may be determined. In some implementations, the computer program may discretize the interpolation trajectory and, in a series of increments, generate transitional latent space vector representations (e.g. interpolation points). Such transitional latent space vectors can then be reconstructed (e.g., mapped-back) to an original image vector space through the generator of the GAN to generate transitional still images corresponding to the video transition sequence between the first video and the second video. In some implementations, the generated transitional still images are of the same dimensions and resolutions as the first video and the second video.

A video transition sequence generated between any two videos can be displayed to the viewer using a suitable graphical user interface to implement a seamless transition between any two videos.

The benefits of the disclosed process include producing a video transition sequence that seamlessly fits in-between the two videos, while the transitions between the two videos is pleasing to the human eye. Generating and discretizing an interpolation trajectory within the latent vector space, as opposed to using still images, has the benefit stemming from morphing of the visual features, as opposed to merely interpolating pixels. This results in softer and smoother changes at the pixel-level that are rendered to the user (viewer).

In such a way, smoother transitions between videos can be displayed between videos in a video sequence. Such transitions can aid in a user's cognitive and emotional adjustment between videos, increasing continuity and coherency, and generally create a more seamless and pleasant viewing experience for a user.

FIG. 1A illustrates an example system architecture capable of supporting a video processing module that generates a video transition sequence, in accordance with one embodiment of the present disclosure.

The system architecture 100A (also referred to as "system" herein) includes an input data store 102, a user interface (UI) 192, and a server 170. Server 170 can include a video processing module 172 software program including root image identification 120, latent vector generation 130, interpolation 140, and reconstruction 150.

In some embodiments, input data store 102, UI 192, and server 170 may be connected via a network (not explicitly shown in FIG. 1A). In certain embodiments, the network may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In other embodiments, video processing module 172, input data store 102, and/or UI 192 may all be a part of one computing device or one server, and transmit data internally (e.g., over a suitable bus/interconnect) and without the use of a network. The computing device may include cloud-based computers, data processing servers, personal computers (PCs), laptops, mobile phones, smart phones, tablet computers, netbook computers, network-connected televisions, rack mount servers, etc.

In some embodiments, video data for processing by the video processing module 172 may be stored by data store 102. Input video data 110 can be transmitted from input data store 102 to server 170; an output video transition sequence 190 can be transmitted from server 170 to UI 192.

In some embodiments, a video transition sequence output by video processing module 172 may be returned to the same memory that originated the video data, e.g., input data store 102 may be implemented as part of a common memory.

In some embodiments, any of input data store 102 is a persistent storage that is capable of storing data as well as data structures to tag, organize, and index the data. A data item may include audio data and/or video stream data, in accordance with embodiments described herein. Input data store 102 may be hosted by one or more storage devices, such as main memory, magnetic or optical storage-based disks, tapes or hard drives, network-attached storage (NAS), storage area network (SAN), and so forth. In some embodiments, input data store 102 may be a network-attached file server, while in other embodiments, data store 102 may be some other type of persistent storage such as an object-oriented database, a relational database, and so forth, that may be hosted on one or more different machines coupled the system architecture 100A via a network. In some embodiments, the data store(s) 102 may store portions of video streams.

In some embodiments, any one of the associated servers, including server 170, may temporarily accumulate and store data until it is transferred to UI 192 for display, or data store 102 for permanent storage.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a specific location of a user cannot be determined. Thus, the user can have control over what information is collected about the user, how that information is used, and what information is provided to the user.

In some embodiments, UI 192 may be presented to a user as a method of displaying the video transition sequence 190. In some embodiments, UI 192 may be a part of a personal client device, such as a laptop, phone, or tablet, etc. In some embodiments, UI 192 may be a part of any client device, capable of displaying a video transition sequence to a user.

In some embodiments, video processing module 172 may be a computer program executed by one or more processor(s) 174 of server 170. In other embodiments, video processing module 172 may be divided across multiple servers and executed by multiple processors. Other system architectures that are different from the one shown in FIG. 1A, in one or more aspects, are within the scope of the instant disclosure and may perform a function that is similar to the function performed by system architecture 100A and video processing module 172.

In some embodiments, server 170 may deploy one or more processor(s) 174, one or more memory 176 devices, a video processing module 172 for performing root image identification 120, latent vector generation 130, interpolation 140, and reconstruction 150 to the input video data.

In some embodiments, video processing module 172 may process multiple video pairs and generate multiple corresponding transition sequences, in parallel. In a non-limiting example, a first video may be currently displayed on a user interface (e.g., being viewed by a user/viewer), and there may exist a number N of potential upcoming videos. For example, the viewer of the current video may be able to select from the N next videos to watch, which may include videos that are already placed on the viewer's playlist by the viewer or (as suggestions) by a media streaming service. In such an instance, the system and video processing module 172 may process and generate multiple (e.g., 2, 3, . . . N) potential transition sequences for each potential, upcoming video, in advance of the viewer selecting a new video. In such a way, the media streaming platform can reduce latency by precomputing one or more video transition sequences, in anticipation of the viewer's decision to select a specific video.

In some embodiments, video transition sequence 190 may be displayed to a viewer of the online videos.

Figure 1B:
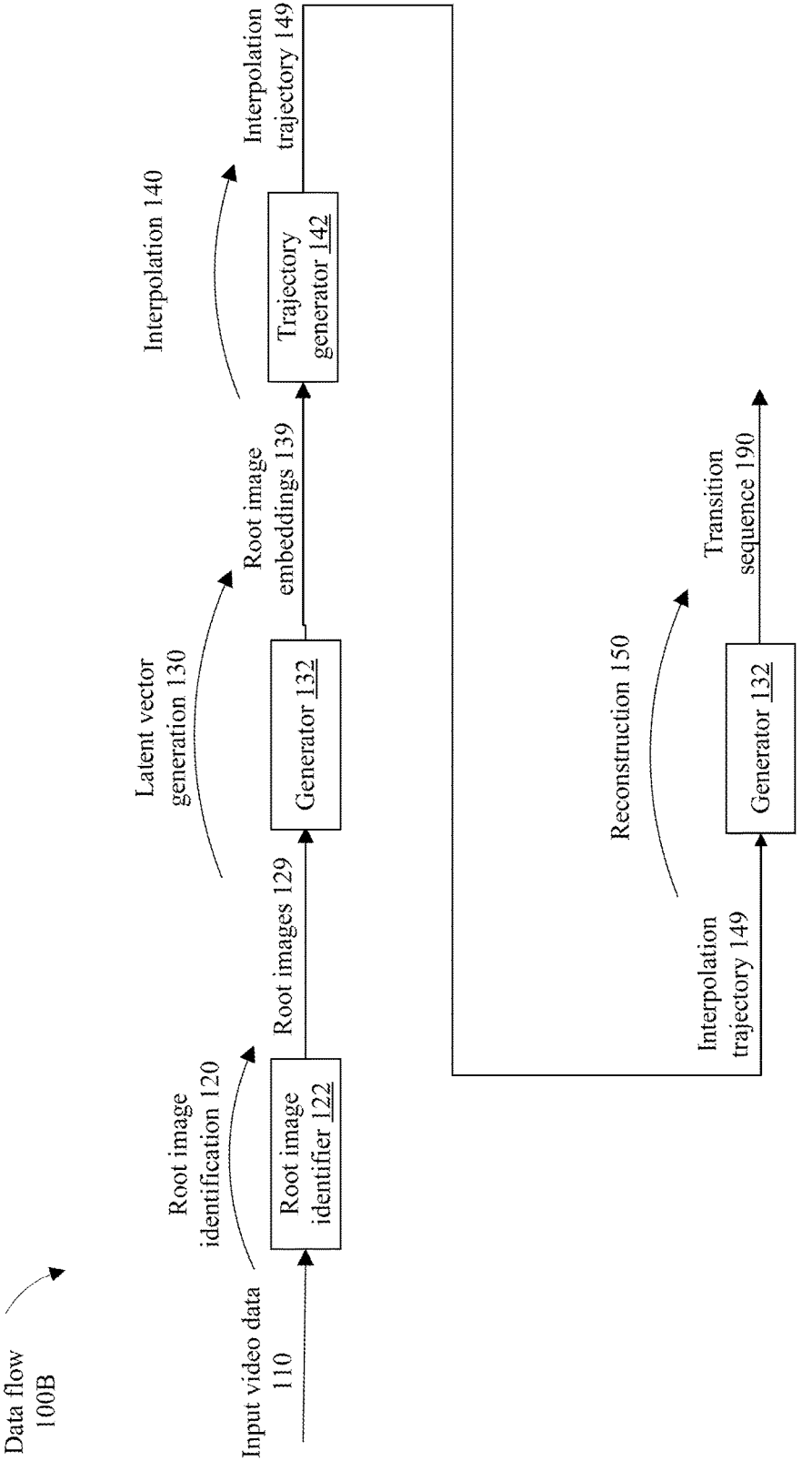
FIG. 1B illustrates an example flow of input video data through the video processing module of FIG. 1A, the proposed methods in accordance with one embodiment of the present disclosure.

A general overview of certain operations of video processing module 172, explained with respect to FIGS. 1A-1B, will now be provided. A more detailed description of these processes will be provided below with respect to FIGS. 2-5.

FIG. 1B illustrates an example flow of input video data through the video processing module of FIG. 1A, the proposed methods in accordance with one embodiment of the present disclosure.

In some embodiments, video processing module 172 (of FIG. 1A) processes data according to dataflow 100B (seen in FIG. 1B). In some embodiments, the video processing module and dataflow operate by first receiving video data, e.g., input video data 110. Input video data 110 can include two distinct videos for which the video processing module will create a transition sequence (i.e., create a transition sequence between the two videos).

Next, root image identification 120 and a root image identifier 122 may identify root images 129, from within the input video data. Root images 129 will be described further with respect to FIG. 2 and can include a starting and ending image for the transition sequence.

Next latent vector generation 130 and a first neural network (e.g., generator network 132) may embed the root images 129 from the original image vector space (e.g. a vector space of the same dimensionality as the root images) into a latent vector space (e.g., a vector space of reduced dimensionality). As will be described further below (and with respect to FIG. 3), the latent vector space may be a dimensionally reduced space when compared to the original image vector space, so that data embedded into the latent vector space may encode features from the original image. Latent vector generation 130 and the first neural network (e.g., generator network 132) may output embeddings of the root images (e.g., root image embeddings 139).

Next, interpolation 140 and trajectory generator 142 may generate an interpolation trajectory 149 from root image embeddings 139. As will be described further with respect to FIG. 4, interpolation trajectory 149 may be a series of interpolation points (e.g., interpolation vectors), within the latent vector space that map a trajectory between the root image embeddings.

Ultimately, reconstruction 150 and a generator network 132 may generate the video transition sequence 190 by reconstructing the interpolation trajectory 149 from the latent vector space to the original image vector space. The video transition sequence 190 may then be stored for future use or immediately displayed to the user/viewer as a transition sequence between two videos. These processes will be described in further detail with respect to FIG. 5.

In some embodiments, generator network 132 may be a part of a pair of networks associated with a generative adversarial network (GAN). In some embodiments, generator network 132 may have been paired with a discriminator network and may have been previously trained (together with a discriminator network) as part of a larger generative adversarial network (GAN). In some embodiments, the GAN is trained using an unsupervised machine learning framework.

In some embodiments, the generator network can be designed, and trained, to generate new data instances resembling instances from a training dataset. In some embodiments, the discriminator can be deployed and trained to discriminate between real or generated (e.g., generated by the generator) data instances. The training dataset can include, but is not limited to, images, text, and/or sound.

In some embodiments, the generator and/or discriminator networks may be implemented as deep learning neural networks. In some embodiments, the generator and discriminator networks may include layers of interconnected nodes or "neurons" designed to transform their input into a desired output.

In some embodiments, an input the generator network of the GAN (e.g., a vector in the latent vector space, e.g., in some instances, a randomly generated vector in the latent vector space) may be processed by multiple neuron layers of the generator network, being transformed at each step by weights, biases, and activation functions. In some embodiments, these transformations may be controlled by parameters learned during the training process.

The generator network may also include advanced features like batch normalization and transposed convolutions, particularly in convolutional GAN architectures such as a deep convolutional GAN (DCGAN). In some embodiments, batch normalization improves the training process by standardizing the inputs to each layer, while transposed convolutions assist the network in generating spatially structured outputs, such as images.

In some embodiments, an input into the discriminator network of the GAN (e.g., a real data instances or synthetic data instances created by the generator network) may be processed by multiple neuron layers of the discriminator network using learned transformations (e.g., similar transformation that may be learned as described with respect to the generator).

In some embodiments, the discriminator network may deploy dropout techniques to prevent overfitting. In some embodiments, the discriminator network may process the input using convolutional layers efficiently capture spatial correlations of the input data. In some embodiments, the final layer of the discriminator network may be a sigmoid activation function that maps the network's output to a value between 0 and 1, corresponding to the probability that the input is real. In alternate embodiments, the activation function and final layer of the discriminator can be replaced with an activation network, or any other kind of algorithm capable of reducing the discriminator network outputs to a binary output.

In some embodiments, the output layer of the generator network is constructed to produce a data instance matching the dimensions of the instances in the real dataset (e.g., an original vector space). For example, in the case of image generation, the output would be an array of pixel values forming an image. In some embodiments, the generator network may output data in a vector space that has increased dimensionality compared with the input latent vector space.

In some embodiments, the goal of the discriminator network is to output a probability indicating whether the input data is real or generated. In some embodiments, e.g., in the case of binary classification, the discriminator network may output a single scalar value between 0 and 1. In some embodiments, the discriminator network may output data in a vector space that is of decreased dimensionality when compared to the input vector space. In some embodiments, the discriminator network may output data into a latent vector space.

In some embodiments, both networks are trained, and/or used, in tandem. In some embodiments, both networks are trained, and/or used, using an adversarial training process. In some embodiment wherein the generator network and discriminator network are trained together in an adversarial process, the generator and discriminator network continually adapt and improve against each other through iterative competition.

In some embodiments, during training, the generator network may be designed to receive a random noise signal as input and output a data instance. The generator network may transform randomly generated input into a data instance, with the aim of this instance resembling real data from the training set. In some embodiments, the objective of the generator in training is to produce data instances that the discriminator network is unable to distinguish from actual data.

In some embodiments, the discriminator network is trained to differentiate between instances drawn from the real data distribution (e.g., the training data) and instances generated by the generator network (e.g., instances generated from randomly generated input). In some embodiments, during training, the discriminator network receives a real or generated data instance as input (which may either be from the original dataset or generated by the generator network). In some embodiments, the discriminator then outputs a probability estimating the origin of the input data instance.

In some embodiments, the adversarial training process employs a minimax loss function, which introduces competitive elements into the iterative training process, e.g., where the discriminator is trained to minimize the differentiation error while the generator is trained to maximize this error. In the iterative training, the weights and biases of both networks may be updated using backpropagation and gradient descent (or variants thereof). For example, in some embodiments, the generator network may seek to produce data instances that the discriminator network classifies as real (i.e., the generator network seeks to "trick" the discriminator into making an erroneous estimation and/or classification), thereby maximizing the error of the discriminator. In an opposite manner, the discriminator network may seek to minimize errors and correctly classify real and generated instances (i.e., the discriminator may seek to identify data instances according to their origin). In some embodiments, the competitive aspects between the two networks during training can result in the generator network improving its ability to create realistic data instances, while the discriminator enhances its ability to differentiate between real and generated data.

In some embodiments, the input to the generator network may be in a latent space, or a latent vector space (e.g., a high-dimensional vector space), wherein each point corresponds to a specific output when fed into the generator network. Such a latent space may encode abstract representations of the data that the generator network system is intended to generate. For example, in the domain of image generation, a latent vector may translate to a specific arrangement of pixels within an image. Manipulating vectors within the latent space can result in altering corresponding features in the generated images. In some embodiments, such manipulations may offer a degree of control over the generation process e.g., smoothly varying the latent vector allows for the smooth transition in the generated data.

In some embodiments, a suitable loss function may be defined to represent the discrepancy between the discriminator network's predictions and the actual labels (e.g., in some cases, 1 for real data and 0 for generated data). A similar loss function metric may be provided to the generator network to represent whether it has successfully "fooled" the discriminator network or not.

In some embodiments, a binary cross-entropy loss function can be used. In some embodiments, a type of image-to-image loss function may be used. In other embodiments, a different loss function may be used, including a Wasserstein loss function, a least-squares loss function, a hinge loss function, a perceptual loss function or any other kind of loss function commonly used within GANs. Since new loss functions are constantly being developed within the field of GANs, the above list of loss functions should be understood as illustrative and non-comprehensive and may be updated and altered to incorporate further state-of-the-art techniques and loss functions for training GAN style networks.

In some embodiments, the weights and biases of both networks are iteratively updated to reduce their loss. In some embodiments, an optimization algorithm such as stochastic gradient descent (SGD) may be used. In other embodiments, an optimization algorithm such as adaptive moment estimation (ADAM), momentum, adagrad, root mean square propagation (RMSProp), Nesterov-accelerated adaptive moment estimation (NADAM), or any other kind of optimization algorithm commonly used within GANs may be used. One of ordinary skill in the art will recognize that such optimization algorithms are part of a rapidly developing field within the field of GANs, and that the above list of optimization algorithms is non-comprehensive and may be updated and altered to incorporate further state-of-the-art techniques and optimization algorithms for training GAN style networks.

In some embodiments, specific architectures of these networks can be customized for the task at hand. In some embodiments, the specific network architecture may be adaptable and updatable. Such networks and algorithms are part of a rapidly developing field of GANs, and it should be understood that the above disclosure and features are intended to be illustrative and not exhaustive and may be updated and altered to incorporate further state-of-the-art techniques for designing and training networks in the style of GANs.

Figure 2:
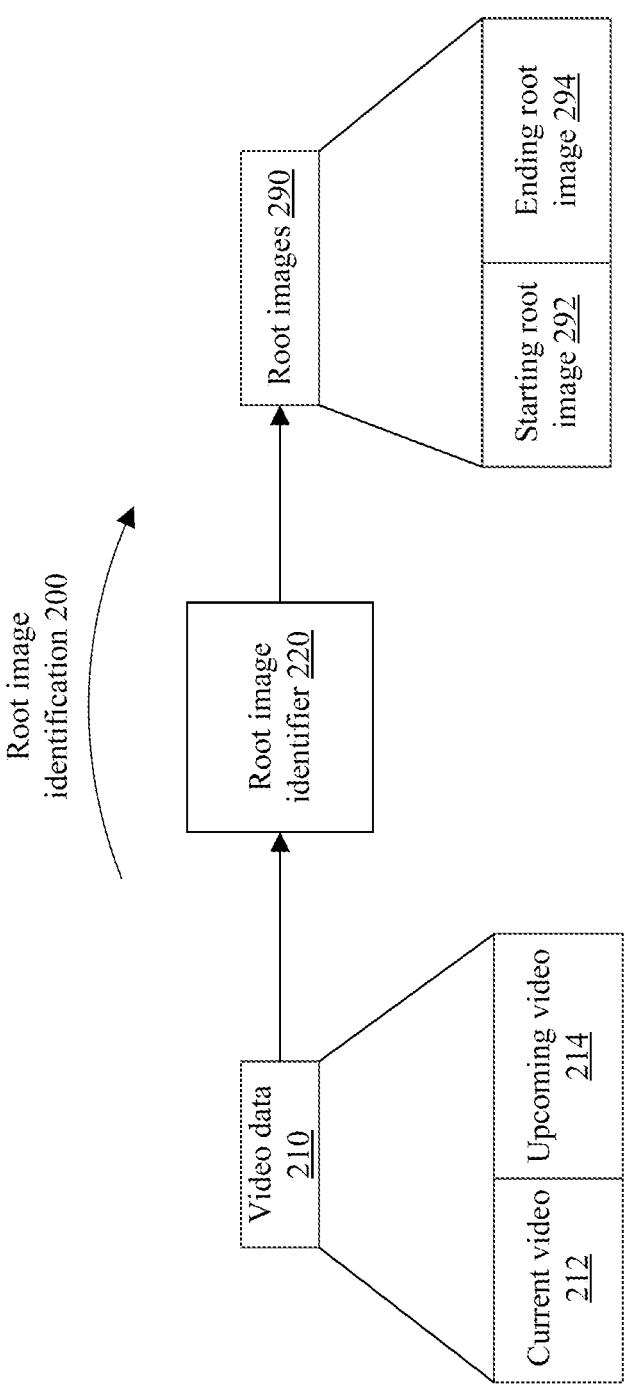
FIG. 2 illustrates an example root image identification subprocess of the video processing module of FIG. 1A, in accordance with one embodiment of the present disclosure.

FIG. 2 illustrates an example root image identification subprocess of the video processing module of FIG. 1A, in accordance with one embodiment of the present disclosure.

In some embodiments, root image identification 200 (which may be the same, or a version of, root image identification 120, as illustrated in FIGS. 1A-1B) and a root image identifier 220 (which may be the same, or a version of, root image identifier 122 as illustrated in FIG. 1B) may identify root images 290 (which may be the same, or a version of, root images 129 as illustrated in FIG. 1B), from input video data 210 (which may be the same, or a version of, input video data 110 as illustrated in FIG. 1B).

In some embodiments, input video data 210 may include two videos that are to be viewed in sequence, such that a video processing module will generate a video transition sequence between the two videos. Thus, in some embodiments, input video data 210 may include a first, current, video 212 and a second, upcoming, video 214.

In some embodiments, the videos within video data 210 may be transmitted using one or more suitable formats, including such formats as MPEG, AVI, WMV, MOV, and/or any other video formats. In some embodiments, the videos within video data 210 may be compressed using a suitable video compression, e.g., H.264, H.265, VP9, and/or any other commonly used video compression standard. In some embodiments, video data 210 may be transmitted as raw data, including raw data matrices and/or pixel values. In some embodiments, the video data 210 may also include audio data.

In some embodiments, the videos within video data 210 may be composed of individual frames, or still images, in sequence. In some embodiments, the videos within video data 210 may have an intended speed at which the frames are to be played at, or an intended frame rate (e.g., 60 Hz).

In some embodiments, the video data may be of any common resolution, or pixel dimensions, commonly associated with an online video streaming platform. For example, the video data may be standard definition (SD) (e.g., 480p), high definition (HD) (e.g., 720p), full HD (FHD) (e.g., 1080p), and so on. The video resolution may further be any reasonable level of resolution used for online video streaming.

In some embodiments, video data 210 may include more than two videos, and root image identifier may extract root images to serve as starting and ending points for transitions sequences between the more than two videos. In a non-limiting example, video data 210 may include four videos, and root image identification may identify six total root images, to create a video transition sequences (i.e., three total transition sequences) between each of the four videos. In some embodiments, fewer than six root images may be identified, e.g., four (or five) root images, with one root image serving as the same starting point for three (or two) transition sequences. One of ordinary skill in the art, having the benefit of this disclosure will be able to design and implement such a root image identifier to extract root images from any number of videos within input video data 210.

In some embodiments, root image identifier 220 may be a computer program that extracts root images 290, including a starting root image 292, and an ending root image, from video data 210. In some embodiments, starting root image 292 may be extracted from the first, current video 212, and ending root image 294 may be extracted from the second, upcoming video 214. In some embodiments, starting root image 292 may denote the starting point of the transition sequence to be generated, and ending root image 294 may denote the ending point of the transition sequence to be generated.

In some embodiments, root image identifier 220 may identify the last frame of current video 212 as the starting root image 292. In some embodiments, root image identifier 220 may identify the first frame of the upcoming video 214 as the ending root image 294. In other embodiments, a more complex decision-making process may be used to identify root images 290. For example, the starting root image 292 may be one of the last frames (e.g., the last frame, the second to the last frame, etc.) of current video 212 that is an image frame, as opposed to a text frame (e.g., a credits frame, a sponsorship frame, etc.) or image/text frame, and/or the like. Similarly, root image identifier 220 may skip one or more starting frames of the upcoming video 214 and use one of actual image frames of the upcoming video 214 as the ending root image 294.

In some embodiments, root image identifier 220 can extract root images in such a way as to maximize the smoothness of the generated transition sequence. For example, should the first current video 212 include a visually-jarring, or otherwise abnormal, ending frame, root image identifier may identify a different starting root image for the transition sequence that is more suitable for the transition sequence. In a non-limiting example, root image identifier can seek to maximize a similarity between the root images identified from each video (e.g., through use of a similarity function e.g., mean squared error (MSE) product in the original vector space of the images or in some other similar way). In a non-limiting example, if the final frame of the current video is unsuitable for a transition, the root image identifier may work backwards through the final frames of the current video, until a suitable frame can be identified to set as the starting root image.

In some embodiments, root image identifier 220 may include one or more rules-based engines and/or trained machine learning models for extracting root images 290. The one or more trained machine learning models may have been trained to receive input video data 210 and extract root images to maximize the smoothness of the generated transition sequence.

In one embodiment, one or more of the trained machine learning models is a regression model trained using regression. Examples of regression models are regression models trained using linear regression or Gaussian regression. A regression model predicts a value of Y given known values of X variables. The regression model may be trained using regression analysis, which may include interpolation and/or extrapolation. In one embodiment, parameters of the regression model are estimated using least squares. Alternatively, Bayesian linear regression, percentage regression, leas absolute deviations, nonparametric regression, scenario optimization and/or distance metric learning may be performed to train the regression model.

In one embodiment, one or more of the trained machine learning models are decision trees, random forests, support vector machines, or other types of machine learning models.

In one embodiment, one or more of the trained machine learning models is an artificial neural network (also referred to simply as a neural network). The artificial neural network may be, for example, a convolutional neural network (CNN) or a deep neural network. In one embodiment, processing logic performs supervised machine learning to train the neural network.

Artificial neural networks generally include a feature representation component with a classifier or regression layers that map features to a target output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). The neural network may be a deep network with multiple hidden layers or a shallow network with zero or a few (e.g., 1-2) hidden layers. Deep learning is a class of machine learning algorithms that use a cascade of multiple layers of nonlinear processing units for feature extraction and transformation. Each successive layer uses the output from the previous layer as input. Neural networks may learn in a supervised (e.g., classification) and/or unsupervised (e.g., pattern analysis) manner. Some neural networks (e.g., such as deep neural networks) include a hierarchy of layers, where the different layers learn different levels of representations that correspond to different levels of abstraction. In deep learning, each level learns to transform its input data into a slightly more abstract and composite representation.

One of more of the trained machine learning models may be recurrent neural networks (RNNs). An RNN is a type of neural network that includes a memory to enable the neural network to capture temporal dependencies. An RNN is able to learn input-output mappings that depend on both a current input and past inputs. One type of RNN that may be used is a long-short term memory (LSTM) neural network.

In some embodiments, starting root image 292 can be a still image that will be used as the starting frame for the transition sequence to be generated, and ending root image 294 can be a still image that will be used as the ending frame for the transition sequence to be generated. In some embodiments, root images 290 can be of the same, or a similar, resolution as the video data 210. For example, root images 290 may be standard definition (SD) (e.g., 480p), high definition (HD) (e.g., 720p), full HD (FHD) (e.g., 1080p), and so on and so forth.

In some embodiments, more than two root images can be identified (i.e., root images 290 may include more than two images).

Figure 3:
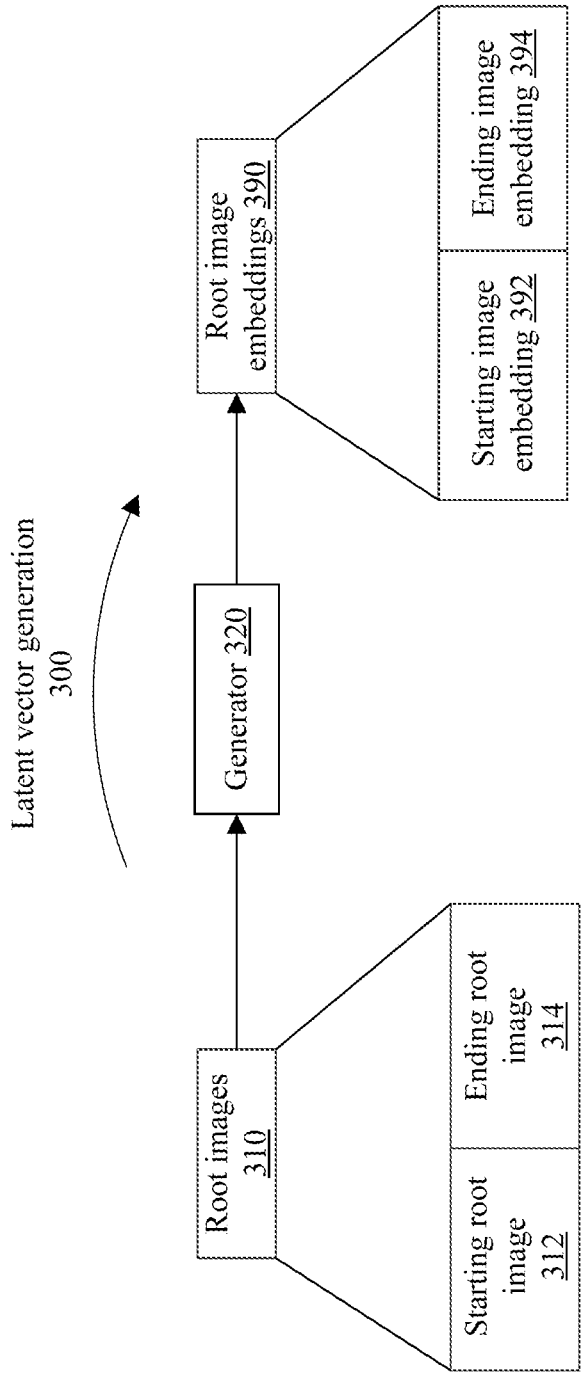
FIG. 3 illustrates an example latent vector generation subprocess of the video processing module of FIG. 1A, in accordance with one embodiment of the present disclosure.

FIG. 3 illustrates an example latent vector generation subprocess of the video processing module of FIG. 1A, in accordance with one embodiment of the present disclosure.

In some embodiments, latent vector generation 300 (which may be the same, or a version of, latent vector generation 130 as seen in FIGS. 1A-1B) and generator network 320 (which may be the same, or a version of, generator network 132 as seen in FIG. 1B) may generate root image embeddings 390 (which may be the same, or a version of, root image embeddings 139 as seen in FIG. 1B), from root images 310 (which may be the same, or a version of, root images 129 as seen in FIG. 1B).

In some embodiments, root images 310 may include starting root image 312, and ending root image 314. In some embodiments, root images 310, starting root image 312, and ending root image 314 may be the same as, respectively, root images 290, starting root image 292, and ending root image 294 (as were described in the disclosure and embodiments with respect to FIG. 2).

In some embodiments, starting root image may be the starting image for the transition sequence to be generated, and ending root image may be the ending image for the transition sequence to be generated. The starting root image and ending root image may pertain to an original image vector space.

In some embodiments, generator network 320 may be a generator network used in a GAN inversion subprocess that generates latent vectors (i.e. root image embeddings 390) from root images 310 (i.e. images in their original vector space).

In some embodiments, generator network 320 may be part of a pair of pre-trained neural networks, e.g., generator network 320 may be a pair of a discriminator-generator network pair belonging to a generative adversarial network (GAN). In some embodiments, generator network 320 may be paired with a discriminator network (e.g., as was discussed with respect to FIG. 1B). In some embodiments, generator network 320 and may be a generator network according to any of the disclosure and/or embodiments described with respect to FIG. 1B.

In some embodiments, generator network 320 may generating root image embeddings 390 through a process called GAN inversion, which will described below.

In some embodiments, GAN inversion can be used to generate latent vector representations of a target image in latent vector space, by iteratively learning the corresponding latent vector representation.

In a non-limiting example, GAN inversion can begin with a random point in the latent space (e.g., a random latent vector). The generator (e.g. trained generator network 320) may then be used to generate a corresponding data instance (e.g. an image) from this latent vector. Initially, when the data instance is generated from a random latent vector, the data instance, will reflect that randomness, and may be a random, or incoherent, image.

Next, GAN inversion may utilize a loss function to generate a loss that represent the difference between the generated data instance and the target data instance (e.g. starting or ending root image of root images 310). In some embodiments, such a loss function may be any of the loss functions described with respect to FIG. 1B, or any other loss function suitable for image-to-image loss. In a single example, this loss can be mean-squared error.

Next, GAN inversion may use an optimization algorithm (e.g. such as any of the optimization algorithms described in FIG. 1B) to minimize the loss by adjusting the latent vector. In a single example, SGD may be used to adjust the latent vector. In such a manner, the latent vector can incrementally approach a latent vector corresponding to a target latent vector (e.g. an image embedding), that will generate the target image (e.g. one of root images 310) when processed by the generator.

After this step, GAN inversion may repeat the steps of generating a data instance, generating a loss, and optimizing the latent vector any number of times. This process may repeat until the generated data instance (e.g. the generated image) from the latent vector is as close as possible to the target data instance (e.g., the target image). In some embodiments, an image-to-image loss can be used to measure the closeness of the generated data instance to the target data instance. The process may finish once such an image-to-image loss crosses a user-defined threshold.

In such a way, GAN inversion (e.g., as implemented by latent vector generation 300 and generator 320) can be used to generate a latent vector representation (e.g., an image embedding such as root image embeddings 390) of a target image (e.g., root images 310).

In some embodiments, generator network 320 may be a different type of neural network, other than a generator pertaining to a GAN. In some embodiments, generator network 320 may be substituted with any type of network, or computer algorithm, capable of reducing the dimensionality and embedding images (e.g., embedding root images 310), and thus produce root image embeddings 390 within a latent vector space. Such a network may be pre-trained. Such a network may be a convolutional neural network (CNN), an autoencoder (e.g., an encoder-decoder network, or a transformer net), a residual network (ResNet), a Siamese network, or any other kind of commonly used network used within image embedding.

In some embodiments, more than one of the above networks, or a chain of any length of networks, may be used to embed the root images and create root image embeddings.

In some embodiments, starting image embedding 392 can be a vector representation of the starting root image within a latent vector space, and ending image embedding 394 can be a vector representation of the starting root image within a latent vector space. In some embodiments, root image embeddings 390 can be embedded into the same latent vector space.

In some embodiments, root image embeddings may be of any dimensionality or reduced vector space when compared to the original image vector space. In some embodiments, root image embeddings may be flat vectors of reduced dimensionality when compared to the original image vector space.

In some embodiments, more than two root images can be embedded (i.e., root images embeddings 390 may include more than two image embeddings).

Figure 4:
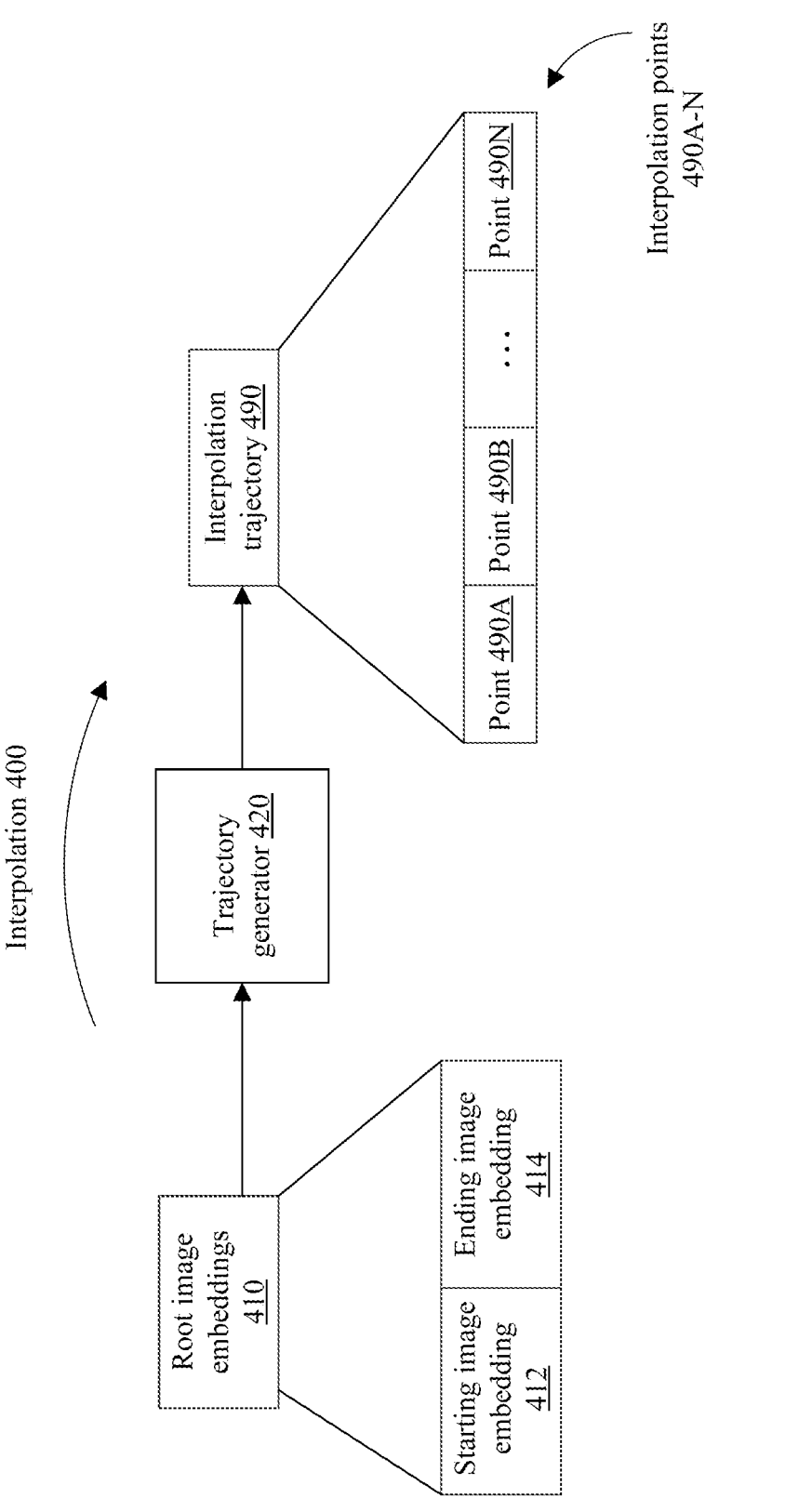
FIG. 4 illustrates an example interpolation subprocess of the video processing module of FIG. 1A, in accordance with one embodiment of the present disclosure.

FIG. 4 illustrates an example interpolation subprocess of the video processing module of FIG. 1A, in accordance with one embodiment of the present disclosure.

In some embodiments, interpolation 400 (which may be the same, or a version of, interpolation 140 as seen in FIGS. 1A-1B) and trajectory generator 420 (which may be the same, or a version of, trajectory generator 142 as seen in FIG. 1B) may generate an interpolation trajectory 490 (which may be the same, or a version of, interpolation trajectory 149 as seen in FIG. 1B), from root image embeddings 410 (which may be the same, or a version of, root image embeddings 139 as seen in FIG. 1B).

In some embodiments, root image embeddings 410 may include starting image embedding 412 and ending image embedding 414. In some embodiments, root image embeddings 410, starting image embedding 412, and ending image embedding 414, may be the same as root image embeddings 390, starting image embedding 392, and ending image embedding 394 (as were described in the disclosure and embodiments with respect to FIG. 3).

In some embodiments, starting image embedding may be the starting embedding for the interpolation trajectory to be generated, and ending image embedding may be the ending embedding for the interpolation trajectory.

In some embodiments, trajectory generator 420 may be a computer program (e.g., a latent space interpolator) that interpolates between starting image embedding 412 and ending image embedding 414 to generate an interpolation trajectory 490 connecting the starting and ending image embedding 412 and 414 via a series of interpolation points

490A-N. In some embodiments, trajectory generator 420 may use polynomial interpolation to generate an interpolation trajectory. In some embodiments, interpolation trajectory 490 may be a series of interpolation points i.e., intermediate vectors, connecting starting image embedding 412 and ending image embedding 414.

In some embodiments, in a version of polynomial interpolation, a higher degree interpolation polynomial than necessary (e.g. a polynomial of a degree N greater than two, since interpolation is being made between two points i.e., starting image embedding 412 and ending image embedding 414) may be used to interpolate between starting image embedding 412 and ending image embedding 414. In such cases, some number of coefficients of the interpolation polynomial may be randomized such that there remains at least one unique solution for the interpolation polynomial. In a non-limiting example of the above embodiment, the interpolation polynomial may be represented according to a Vandermonde matrix. A representation of such an embodiment is seen below, where $x_0$ and $x_1$ represent first and second components (e.g. components of a starting vector) of the starting point for interpolation, $y_0$ and $y_1$ represent first and second components (e.g. components of an ending vector) of an ending point for interpolation, and $a_0$ through $a_n$ represent coefficients:

$$\begin{pmatrix} x_0^n & x_0^{n-1} & x_0^{n-2} & \dots & x_0 & 1 \\ x_1^n & x_1^{n-1} & x_1^{n-2} & \dots & x_1 & x_1 \end{pmatrix} \begin{pmatrix} a_n \\ a_{n-1} \\ \dots \\ a_0 \end{pmatrix} = \begin{pmatrix} y_0 \\ y_1 \end{pmatrix}$$

One will recognize, that in certain embodiments, the starting and ending points may be represented by vectors including more than two components (i.e. of a higher dimensionality than two). In some embodiments of such a polynomial interpolation method, any number, or order, of coefficients of the interpolation polynomial may be randomized such that there remains at least one unique solution for the interpolation polynomial.

In alternative embodiments, trajectory generator 420 may employ any type of a polynomial interpolation method (e.g., Langrage interpolating polynomial), normalized interpolation, linear interpolation, spherical interpolation, Bezier interpolation, GANspace interpolation, or any other kind of vector interpolation that could be reasonably be applied to interpolate between the root image embeddings 410.

In some embodiments, interpolation trajectory 490 may be a series of interpolation points 490A-N i.e., intermediate vectors, connecting starting image embedding 412 and ending image embedding 414.

In some embodiments, interpolation trajectory 490 can include N number of interpolation points 490A-N. In some embodiments, N can be user-set. In some embodiments, N can be a scalar large enough such that if each interpolation point is reconstructed from an interpolation point (i.e., a vector in the latent vector space) to an image in the original image space, sufficient images are produced so as to create a stable frame rate (e.g., greater than 30 Hz, e.g., greater than 60 Hz) with the number of images (e.g. video frames) N that are displayed during the video transition sequence. In some embodiments, N can be a scalar large such that sufficient images within the video transition sequence are produced so as to create a stable frame rate (e.g., greater than 30 Hz, e.g., greater than 60 Hz) with the number of images (e.g. video frames) N that will be displayed during the video transition sequence.

Figure 5:
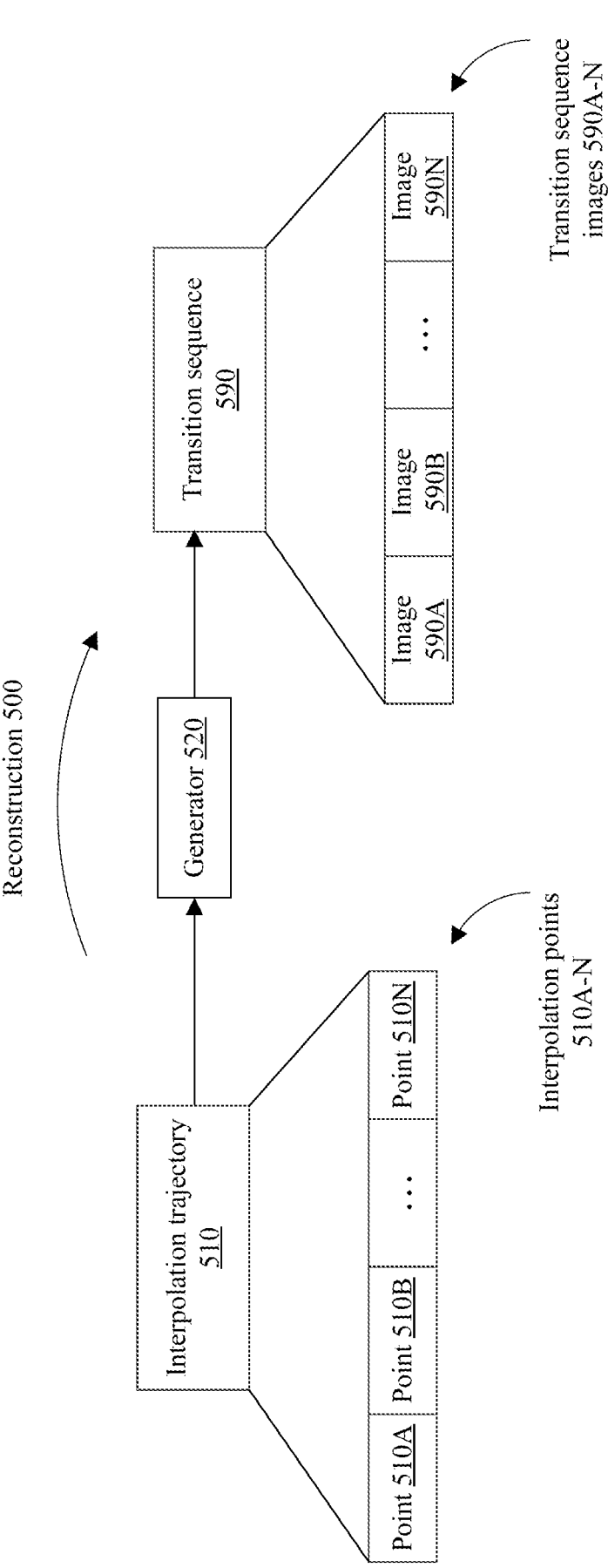
FIG. 5 illustrates an example reconstruction subprocess of the video processing module of FIG. 1A, in accordance with one embodiment of the present disclosure.

FIG. 5 illustrates an example reconstruction subprocess of the video processing module of FIG. 1A, in accordance with one embodiment of the present disclosure.

In some embodiments, reconstruction 500 (which may be the same, or a version of, reconstruction 150 as seen in FIGS. 1A-1B) and generator network 520 (which may be the same, or a version of, generator network 132 as seen in FIG. 1B) may generate a transition sequence 590 (which may be the same, or a version of, transition sequence 190 as seen in FIG. 1A-1B), from interpolation trajectory 510 (which may be the same, or a version of, interpolation trajectory 149 as seen in FIG. 1B).

In some embodiments, interpolation trajectory 510 may include interpolation points 510A-N. In some embodiments, interpolation trajectory 510 and interpolation points 510A-N, may be the same as interpolation trajectory 490 and interpolation points 490A-N (as were described in the disclosure and embodiments with respect to FIG. 4).

In some embodiments, generator network 520 may be a generator network that reconstructs transition sequence 590 and transition sequence images 590A-N in the original image vector space from the interpolation trajectory 510 in the latent vector space.

In some embodiments, generator network 520 may be part of a pair of pre-trained neural networks, e.g., generator network 520 may be a pair of a discriminator-generator network pair belonging to a generative adversarial network (GAN).

In some embodiments, generator network 520 and may be a generator network according to any of the disclosure and embodiments described with respect to FIG. 1B.

In some embodiments, generator network 520 may be a different type of neural network, or a network other than a generator pertaining to a GAN. In some embodiments, generator network 520 may be substituted with any type of network, or computer algorithm, capable of reconstructing the dimensionality and embedded image data (e.g., from embedded interpolation points 510A-N), and thus produce transition sequence 590 and transition sequence images 590A-N. Such a network may be pre-trained. Such a network may be a convolutional neural network (CNN), an autodecoder (e.g., an encoder-decoder network, or a transformer net), a residual network (ResNet), a Siamese network, or any other kind of commonly used network used within image embedding. One of ordinary skill in the art will recognize that these networks and algorithms are part of a rapidly developing field of image embedding, and that this list is non-comprehensive, and may be updated and altered to incorporate further state-of-the-art techniques for embedding images into a latent vector space.

In some embodiments, more than one of the above networks, or a chain of any length of networks, may be used to embed the root images and create root image embeddings.

In some embodiments, transition sequence 590 may include transition sequence images 590A-N. In some embodiments, transition sequence images 590A-N may correspond to reconstructions of interpolation points 510A-N i.e., generator network 520 may reconstruct each interpolation point from the latent vector space into the original image space, thus producing an image for every interpolation point. Each image of transition sequence images 590A-N may correspond to an interpolation point, and thus represent at path between the first interpolation point and the final interpolation point. Thus, in some embodiments, transition sequence images 590A-N may present a smooth transition between the starting root image and ending root image (as discussed with respect to FIGS. 2-3).

In some embodiments, transition sequences images may include sufficient N amount of images so as to present a stable frame rate (e.g., greater than 30 Hz, e.g., greater than 60 Hz) during the presentation of the transition sequence to a viewer.

In some embodiments, the total duration of the video transition sequence is equal to the duration of a loading time of the next video (e.g. upcoming video 214 as seen in FIG. 2). In other embodiments, the duration of the video transition sequence can be longer than the loading time of the next video.

In some embodiments, the video transition sequence can begin to play as soon as a user selects a next video (e.g. upcoming video 214 as seen in FIG. 2).

Figure 6:
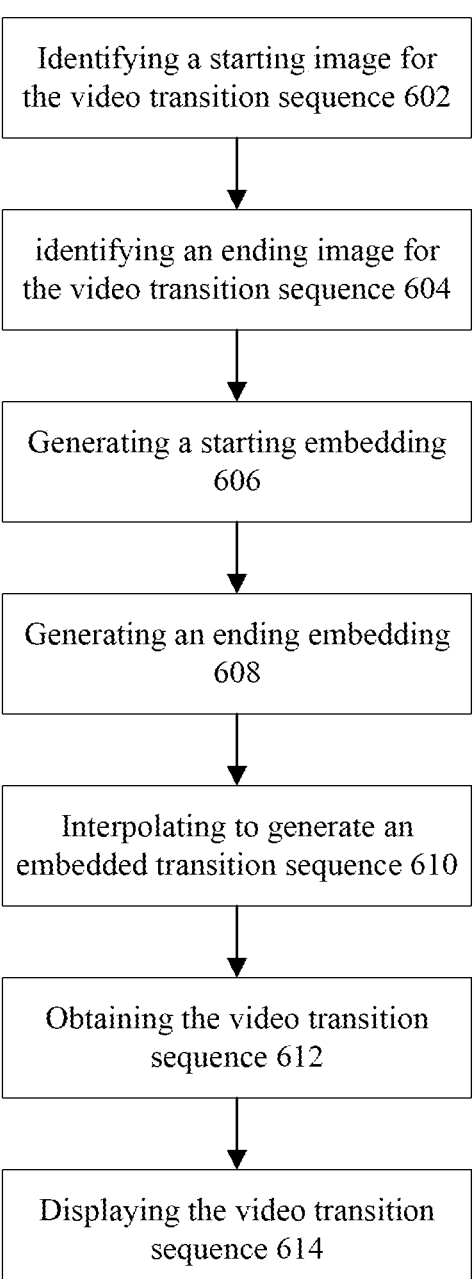
FIG. 6 is a flow diagram of an example method of generating a video transition sequence between a first video and a second video, in accordance with one embodiment of the present disclosure.

FIG. 6 is a flow diagram of an example method of generating a video transition sequence between a first video and a second video, in accordance with one embodiment of the present disclosure.

Method 600 may be performed by a processing device that may include hardware, software, or a combination of both. The processing device (e.g., processor 174 of server 170 in FIG. 1A) may include one or more central processing units (CPUs), graphics processing units (GPUs), field-programmable gate arrays (FPGAs), application-specific integrated circuits (ASICs), or the like, or any combination thereof.

In one embodiment, method 600 may be performed by the video processing module 172 and the associated algorithms, e.g., as described in conjunction with FIGS. 1-5. In certain embodiments, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other. Therefore, while FIG. 6 and the associated descriptions list the operations of method 600 in a certain order, in some embodiments, at least some of the described operations may be performed in parallel and/or in a different order. In some embodiments one or more operations of method 600 are not performed.

At block 602, method 600 may include identifying a starting image for the video transition sequence. In some embodiments, operations of block 602 may be performed by a processing device executing instruction of root image identification 200 of the video processing module 172, e.g., as disclosed in conjunction with FIGS. 1A, 1B, and 2.

At block 604, method 600 may include identifying an ending image for the video transition sequence. In some embodiments, operations of block 604 may be performed by a processing device executing instruction of root image identification 200 of the video processing module 172, e.g., as disclosed in conjunction with FIGS. 1A, 1B, and 2.

At block 606, method 600 may include generating a starting embedding. In some embodiments, operations of block 606 may be performed by a processing device executing instruction of latent vector generation 300 of the video processing module 172, e.g., as disclosed in conjunction with FIGS. 1A, 1B, and 3.

At block 608, method 600 may include generating an ending embedding. In some embodiments, operations of block 608 may be performed by a processing device executing instruction of latent vector generation 300 of the video processing module 172, e.g., as disclosed in conjunction with FIGS. 1A, 1B, and 3.

At block 610, method 600 may include interpolating to generate an embedded transition sequence. In some embodiments, operations of block 610 may be performed by a processing device executing instruction interpolation 400 of the video processing module 172, e.g., as disclosed in conjunction with FIGS. 1A, 1B, and 4.

At block 612, method 600 may include obtaining the video transition sequence. In some embodiments, operations of block 612 may be performed by a processing device executing instruction reconstruction 500 of the video processing module 172, e.g., as disclosed in conjunction with FIGS. 1A, 1B, and 5.

At block 614, method 600 may include displaying the video transition sequence. In some embodiments, operations of block 612 may be performed by a processing device executing instruction reconstruction 500 of the video processing module 172, e.g., as disclosed in conjunction with FIGS. 1A, 1B, and 5.

Figure 7:
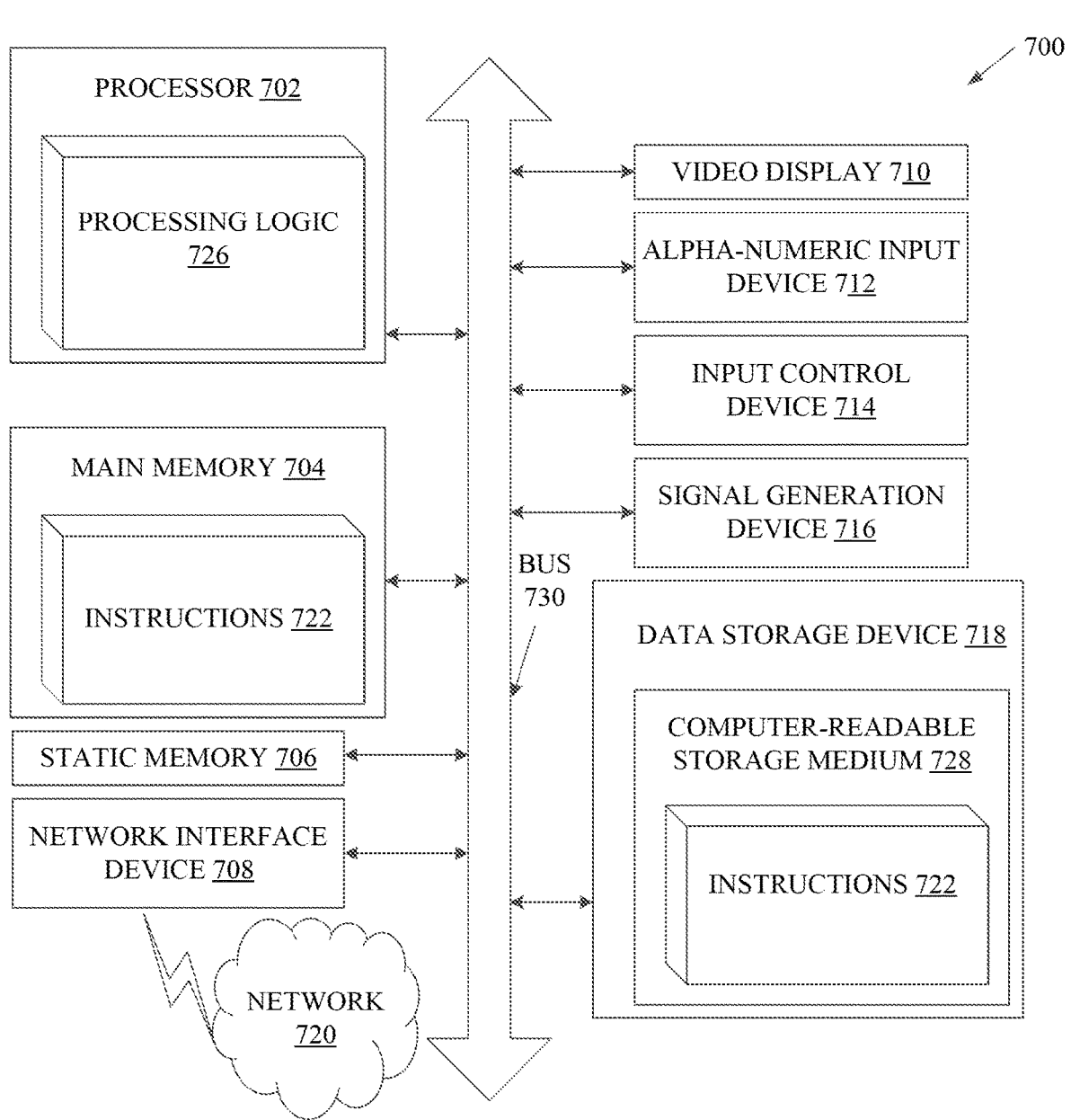
FIG. 7 depicts a block diagram of an example processing device operating in accordance with one or more aspects of the present disclosure.

FIG. 7 depicts a block diagram of an example processing device operating in accordance with one or more aspects of the present disclosure.

FIG. 7 depicts a block diagram of an example processing device 700 operating in accordance with one or more aspects of the present disclosure. In one implementation, the processing device 700 may be a part of any computing device of FIG. 1A, or any combination thereof. Example processing device 700 may be connected to other processing devices in a LAN, an intranet, an extranet, and/or the Internet. The processing device 700 may be a personal computer (PC), a set-top box (STB), a server, a network router, switch or bridge, or any device capable of executing a set of instructions (sequential or otherwise) that specify actions to be taken by that device. Further, while only a single example processing device is illustrated, the term "processing device" shall also be taken to include any collection of processing devices (e.g., computers) that individually or jointly execute a set (or multiple sets) of instructions to perform any one or more of the methods discussed herein.

Example processing device 700 may include a processor 702 (e.g., a CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which may communicate with each other via a bus 730.

Processor 702 represents one or more general-purpose processing devices such as a microprocessor, central processing unit, or the like. More particularly, processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. In accordance with one or more aspects of the present disclosure, processor 702 may be configured to execute instructions (e.g. processing logic 726 may implement video processing module 172 of FIG. 1A).

Example processing device 700 may further comprise a network interface device 708, which may be communicatively coupled to a network 720. Example processing device 700 may further comprise a video display 710 (e.g., a liquid crystal display (LCD), a touch screen, or a cathode ray tube (CRT)), an alphanumeric input device 712 (e.g., a keyboard), an input control device 714 (e.g., a cursor control device, a touch-screen control device, a mouse), and a signal generation device 716 (e.g., an acoustic speaker).

Data storage device 718 may include a computer-readable storage medium (or, more specifically, a non-transitory computer-readable storage medium) 728 on which is stored one or more sets of executable instructions 722. In accordance with one or more aspects of the present disclosure, executable instructions 722 may comprise executable instructions (e.g. implementing video processing module 172 of FIG. 1A).

Executable instructions 722 may also reside, completely or at least partially, within main memory 704 and/or within processor 702 during execution thereof by example processing device 700, main memory 704 and processor 702 also constituting computer-readable storage media. Executable instructions 722 may further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

It should be understood that the above description is intended to be illustrative, and not restrictive. Many other embodiment examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The embodiments of methods, hardware, software, firmware, or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment, embodiment, and/or other exemplarily language does not necessarily refer to the same embodiment or the same example, but may refer to different and distinct embodiments, as well as potentially the same embodiment.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. Also, the terms "first," " "second," "third," "fourth," etc. as used herein are meant as labels to distinguish among different elements and may not necessarily have an ordinal meaning according to their numerical designation.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. The essential elements of a digital computer a central processing unit for performing or executing instructions and one or more memory devices for storing instructions and digital data. The central processing unit and the memory can be supplemented by, or incorporated in, special purpose logic circuitry or quantum simulators. Generally, a digital computer will also include, or be operatively coupled to receive digital data from or transfer digital data to, or both, one or more mass storage devices for storing digital data, e.g., magnetic, magneto-optical disks, optical disks, or systems suitable for storing information. However, a digital computer need not have such devices.

Digital computer-readable media suitable for storing digital computer program instructions and digital data include all forms of non-volatile digital memory, media, and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks.

Control of the various systems described in this specification, or portions of them, can be implemented in a digital computer program product that includes instructions that are stored on one or more non-transitory machine-readable storage media, and that are executable on one or more digital processing devices. The systems described in this specification, or portions of them, can each be implemented as an apparatus, method, or system that may include one or more digital processing devices and memory to store executable instructions to perform the operations described in this specification.

While this specification contains many specific embodiment details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for generating a video transition sequence between a first video and a second video, the method comprising:

identifying, for the video transition sequence, a starting image and an ending image, wherein the starting image is associated with the first video and the ending image is associated with the second video;

generating, using one or more neural networks, a starting embedding of the starting image, wherein the starting embedding is associated with a starting point in a latent vector space;

generating, using the one or more neural networks, an ending embedding of the ending image, wherein the ending embedding is associated with an ending point in the latent vector space;

generating a trajectory of points in the latent vector space, the trajectory of points comprising (i) the starting point, (ii) the ending point, and (iii) a plurality of intermediate points in the latent vector space interpolating between the starting point and the ending point; and obtaining, using the one or more neural networks, the video transition sequence between the first video and the second video using the trajectory of points in the latent vector space, wherein the video transition sequence comprises a plurality of frames, each frame of the plurality of frames reconstructed based on a respective intermediate point of the plurality of intermediate points in the latent vector space; and displaying, on a graphical user interface, the obtained video transition sequence between the first video and the second video.

2. The method of claim 1, wherein identifying the starting image and the ending image is based on at least one of a similarity between the starting image and the ending image, a proximity of the ending image to a first image of the second video, or a proximity of the starting image to a last image of the first video.

3. The method of claim 1, wherein the one or more neural networks comprise a generative adversarial network (GAN) that comprises a discriminator network and a generator network.

4. The method of claim 3, wherein the starting embedding and the ending embedding are generated using the generator network of the GAN.

5. The method of claim 3, wherein the video transition sequence between the first video and the second video is obtained using the generator network of the GAN.

6. The method of claim 3, wherein the generator network and the discriminator network of the GAN are pre-trained using videos associated with a video-streaming platform, and wherein the generator network is pre-trained using labels generated by the discriminator network of the GAN, a loss function applied to the labels, and an optimization algorithm.

7. The method of claim 1, wherein generating the trajectory of points in the latent vector space comprises using at least one of a linear interpolation, a spherical linear interpolation, or a polynomial interpolation.

8. The method of claim 3, further comprising using an interpolation polynomial, wherein one or more coefficients of the interpolation polynomial are randomly generated.

9. The method of claim 1, wherein the video transition sequence between the first video and the second video has a frame rate of 30 frames per second or more.

10. The method of claim 1, wherein the video transition sequence between the first video and the second video has a duration that is determined by a loading time of the second video, wherein the second video begins to load once the first video has ended.

11. The method of claim 1, wherein the second video comprises at least one of a video suggested to a user or a video on a playlist for the user, wherein the video transition sequence between the first video and the second video is obtained while the first video is being displayed to the user and prior to receiving a user request for the second video, and wherein displaying the obtained video transition sequence is responsive to receiving the user request for the second video.

12. The method of claim 11, further comprising:

obtaining, prior to receiving the user request for the second video, an additional video transition sequence between the first video and a third video.

13. A system for generating a video transition sequence, comprising:

a memory device; and a processing device communicatively coupled to the memory device, wherein the processing device is to:

identify, for the video transition sequence, a starting image and an ending image, wherein the starting image is associated with a first video and the ending image is associated with a second video;

generate, using one or more neural networks, a starting embedding of the starting image, wherein the starting embedding is associated with a starting point in a latent vector space;

generate, using the one or more neural networks, an ending embedding of the ending image, wherein the ending embedding is associated with an ending point in the latent vector space;

generate a trajectory of points in the latent vector space, the trajectory of points comprising (i) the starting point, (ii) the ending point, and (iii) a plurality of intermediate points in the latent vector space interpolating between the starting point and the ending point; and obtain, using the one or more neural networks, the video transition sequence between the first video and the second video using the trajectory of points in the latent vector space; and display, on a graphical user interface, the obtained video transition sequence between the first video and the second video.

14. The system of claim 13, wherein identifying the starting image and the ending image is based on at least one of a similarity between the starting image and the ending image, a proximity of the ending image to a first image of the second video, or a proximity of the starting image to a last image of the first video.

15. The system of claim 13, wherein the one or more neural networks comprise a generative adversarial network (GAN) that comprises a discriminator network and a generator network.

16. The system of claim 15, wherein the starting embedding and the ending embedding are generated using the generator network of the GAN.

17. The system of claim 15, wherein the video transition sequence between the first video and the second video is obtained using the generator network of the GAN.

18. The system of claim 15, wherein the generator network and the discriminator network of the GAN are pre-trained using videos associated with a video-streaming platform, and wherein the generator network is pre-trained using labels generated by the discriminator network of the GAN, a loss function applied to the labels, and an optimization algorithm.

19. The system of claim 13, wherein to generate the trajectory of points in the latent vector space, the processing device is to use at least one of a linear interpolation, a spherical linear interpolation, or a polynomial interpolation.

20. A non-transitory computer readable storage medium comprising instructions that, when executed by a processing device, causes the processing device to perform operations comprising:

identifying, for a video transition sequence, a starting image and an ending image, wherein the starting image is associated with a first video and the ending image is associated with a second video;

generating, using one or more neural networks, a starting embedding of the starting image, wherein the starting embedding is associated with a starting point in a latent vector space;

generating, using the one or more neural networks, an ending embedding of the ending image, wherein the ending embedding is associated with an ending point in the latent vector space;

generating a trajectory of points in the latent vector space, the trajectory of points comprising (i) the starting point, (ii) the ending point, and (iii) a plurality of intermediate points in the latent vector space interpolating between the starting point and the ending point; and obtaining, using the one or more neural networks, the video transition sequence between the first video and the second video using the trajectory of points in the latent vector space, wherein the video transition sequence comprises a plurality of frames, each frame of the plurality of frames reconstructed based on a respective intermediate point of the plurality of intermediate points in the latent vector space; and displaying, on a graphical user interface, the obtained video transition sequence between the first video and the second video.

\*   \*   \*   \*   \*